(12) United States Patent
Choi (10) Patent No.: US 11,305,721 B2
(45) Date of Patent: Apr. 19, 2022

(54) CURTAIN AIRBAG SYSTEM OF VEHICLE

(71) Applicants: Hyundai Motor Company, Seoul (KR); Kia Motors Corporation, Seoul (KR)

(72) Inventor: Jun Yeol Choi, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 13 days.

(21) Appl. No.: 16/824,012

(22) Filed: Mar. 19, 2020

(65) Prior Publication Data

US 2021/0107425 A1 Apr. 15, 2021

(30) Foreign Application Priority Data

Oct. 15, 2019 (KR) .......................... 10-2019-0127927

(51) Int. Cl.
| | | |
|---|---|---|
| *B60R 21/232* | (2011.01) | |
| *B60R 21/2338* | (2011.01) | |
| *B60R 21/213* | (2011.01) | |
| *B60R 21/237* | (2006.01) | |

(52) U.S. Cl.
CPC .......... *B60R 21/232* (2013.01); *B60R 21/213* (2013.01); *B60R 21/237* (2013.01); *B60R 21/2338* (2013.01); *B60R 2021/2375* (2013.01); *B60R 2021/23386* (2013.01)

(58) Field of Classification Search
CPC . B60R 21/213; B60R 21/232; B60R 21/2338; B60R 21/237; B60R 2021/23153; B60R 2021/23386; B60R 2021/2375
See application file for complete search history.

(56) References Cited

U.S. PATENT DOCUMENTS

| | | | | |
|---|---|---|---|---|
| 5,265,903 A * | 11/1993 | Kuretake | ............... | B60R 21/213 280/730.2 |
| 6,152,481 A * | 11/2000 | Webber | ............... | B60R 21/2338 280/730.2 |
| 6,168,194 B1 * | 1/2001 | Cuevas | ................. | B60R 21/232 280/730.2 |
| 6,176,515 B1 * | 1/2001 | Wallner | ................ | B60R 21/232 280/729 |
| 6,234,517 B1 * | 5/2001 | Miyahara | ................ | B60R 21/04 280/730.2 |

(Continued)

FOREIGN PATENT DOCUMENTS

| | | |
|---|---|---|
| JP | 2016-185733 A | 10/2016 |
| KR | 10-2006-0088208 A | 8/2006 |

(Continued)

*Primary Examiner* — Laura Freedman
(74) *Attorney, Agent, or Firm* — Mintz Levin Cohn Ferris Glovsky and Popeo, P.C.; Peter F. Corless (57) ABSTRACT

A curtain airbag system of a vehicle is provided and omits a front or rear pillar area of a roof/side frame for a space for accommodating an airbag cushion. The airbag cushion is guided by a connection tether for a deployment direction to deploy the airbag cushion to a protection zone for an occupant. Additionally, the airbag cushion is folded in a zigzag form to expose the connection tether, thereby guiding the airbag cushion for the deployment direction and securing a deployment speed.

12 Claims, 4 Drawing Sheets

(56) References Cited

U.S. PATENT DOCUMENTS

| | | | | |
|---|---|---|---|---|
| 6,237,939 B1* | 5/2001 | Resh | | B60R 21/213 280/730.2 |
| 6,273,458 B1* | 8/2001 | Steffens, Jr. | | B60R 21/232 280/730.2 |
| 6,276,712 B1* | 8/2001 | Welch | | B60R 21/232 280/730.2 |
| 6,308,982 B1* | 10/2001 | Wallner | | B60R 21/232 280/730.2 |
| 6,361,069 B1* | 3/2002 | Saito | | B60R 21/23184 280/730.2 |
| 6,367,836 B1* | 4/2002 | Tanase | | B60R 21/213 280/730.2 |
| 6,375,216 B1* | 4/2002 | Eschbach | | B60R 21/232 280/730.1 |
| 6,419,268 B1* | 7/2002 | Webert | | B60R 21/232 280/730.2 |
| 6,422,593 B1* | 7/2002 | Ryan | | B60R 21/232 280/730.2 |
| 6,431,588 B1* | 8/2002 | Bayley | | B60R 21/232 280/730.2 |
| 6,464,250 B1* | 10/2002 | Faigle | | B60R 21/232 280/730.2 |
| 6,505,853 B2* | 1/2003 | Brannon | | B60R 21/232 280/729 |
| 6,565,118 B2* | 5/2003 | Bakhsh | | B60R 21/232 280/730.2 |
| 6,575,496 B2* | 6/2003 | Hess | | B60R 21/232 280/730.2 |
| 6,688,641 B2* | 2/2004 | Dominissini | | B60R 21/232 280/730.2 |
| 6,695,347 B2* | 2/2004 | Sonnenberg | | B60R 21/232 280/730.2 |
| 6,846,010 B2* | 1/2005 | Enders | | B60R 21/232 280/729 |
| 6,848,708 B2* | 2/2005 | Green | | B60R 21/232 280/729 |
| 6,851,710 B2* | 2/2005 | Wong | | B60R 21/213 280/743.2 |
| 6,945,558 B2* | 9/2005 | Hall | | B60R 21/232 280/730.2 |
| 6,991,255 B2* | 1/2006 | Henderson | | B60R 21/232 280/730.2 |
| 7,066,489 B2* | 6/2006 | Hsu | | B60R 21/239 280/730.2 |
| 7,243,940 B2 | 7/2007 | Tesch et al. | | |
| 7,357,408 B2* | 4/2008 | Hall | | B60R 21/213 280/728.2 |
| 7,513,523 B2* | 4/2009 | Bayley | | B60R 21/232 280/730.2 |
| 7,823,922 B2* | 11/2010 | Mitchell | | B60R 21/232 280/743.2 |
| 8,006,998 B2* | 8/2011 | Hatfield | | B60R 21/232 280/730.2 |
| 8,562,018 B1* | 10/2013 | Wantin | | B60R 21/232 280/730.2 |
| 8,894,094 B2* | 11/2014 | Wang | | B60R 21/2338 280/730.2 |
| 9,487,180 B2* | 11/2016 | Nakashima | | B60R 21/213 |
| 9,505,373 B2* | 11/2016 | Moon | | B60R 21/237 |
| 10,696,265 B2* | 6/2020 | Shin | | B60R 21/233 |
| 2006/0012156 A1* | 1/2006 | Boxey | | B60R 21/232 280/730.2 |
| 2016/0107599 A1* | 4/2016 | Lee | | B60R 21/237 280/730.2 |

FOREIGN PATENT DOCUMENTS

| | | |
|---|---|---|
| KR | 100640008 B1 | 10/2006 |
| KR | 100736462 B1 | 6/2007 |

\* cited by examiner

CURTAIN AIRBAG SYSTEM OF VEHICLE

CROSS REFERENCE TO RELATED APPLICATION

The present application claims priority to Korean Patent Application No. 10-2019-0127927, filed Oct. 15, 2019, the entire contents of which is incorporated herein for all purposes by this reference.

BACKGROUND

1. Technical Field

The present disclosure relates to a curtain airbag system of a vehicle protecting an occupant from side impact, and more particularly, to a curtain airbag system that more accurately deploy the airbag to a protection zone of an occupant and secures a deployment speed.

2. Description of the Related Art

A vehicle is equipped with various airbags to protect occupants from collisions. Among these airbags, a curtain airbag system, which protects an occupant from a side collision of the vehicle, is installed in a front and rear direction along a lateral surface of a roof panel to absorb a shock transmitted to the occupant when a collision occurs and also to secure the occupant in place to prevent the occupant from being thrown out of the vehicle.

Recently, a vehicle body has been developed with a slimmer pillar trim. As a result, a space for mounting the curtain airbag system is insufficient. In other words, the curtain airbag system needs to secure a protection zone up to a front section inside the vehicle when deployed, and it is necessary to secure a space for mounting the curtain airbag system in the front and backward direction of the roof frame. However, when the pillar trim is slim, the space for installing the curtain airbag system is insufficient, resulting in a problem that the curtain airbag system does not cover the front section inside the vehicle even when deployed.

Accordingly, it is required to develop a curtain airbag system making it possible to reduce a space for installing the curtain airbag system, secure a protection zone, and secure a deployment speed. The contents described as the related art have been provided merely to assist in understanding the background of the present disclosure and should not be considered as corresponding to the related art known to those having ordinary skill in the art.

SUMMARY

An object of the present disclosure is to provide a curtain airbag system of a vehicle making it possible to reduce a space for accommodating a curtain airbag system, accurately deploy the curtain airbag system to a protection zone for an occupant, and secure a deployment speed.

According to an exemplary embodiment of the present disclosure, a curtain airbag system of a vehicle may include: an airbag cushion disposed to be deployed from a side frame of a vehicle body toward a side of an occupant, and inflated to extend in a forward or backward direction after being deployed in a downward direction from the side frame when a collision occurs; and a connection tether having a first end spaced and fastened apart from the airbag cushion in front of or behind the airbag cushion and a second end connected to the airbag cushion to guide the airbag cushion to be inflated in the forward or backward direction.

When the airbag cushion is configured to be inflated in the forward direction, the first end of the connection tether may be fastened to the side frame while being spaced apart from the airbag cushion in front of the airbag cushion, and the second end of the connection tether may be connected to a rear end portion of the airbag cushion across a front end portion of the airbag cushion. The airbag cushion may be fastened to the side frame via a fastener formed at an upper end thereof, and the fastener may be disposed at an opposite side of an inflation direction of the airbag cushion that is directed in the forward or backward direction. When the airbag cushion is configured to be inflated in the forward direction, the fastener may be disposed at the upper end of the airbag cushion in an area excluding the front end portion and fastened to the side frame.

The front end portion of the airbag cushion may include a guide chamber for the connection tether to pass therethrough. Additionally, the front end portion of the airbag cushion may be folded in a zigzag form in the backward direction to thus expose the guide chamber, with a lower end being rolled in an upward direction in the zigzag-folded state. The front end portion of the airbag cushion may be folded in the zigzag form while avoiding a portion where the second end of the connection tether is connected, and overlapping portions in the zigzag-folded state may be tacked.

The airbag cushion may have a first dead zone that extends in a length direction at an upper side of the front end portion. The airbag cushion may also have a second dead zone at a point where the second end of the connection tether is connected. The airbag cushion may be accommodated in a center pillar area of the side frame, and inflated toward a front or rear pillar when deployed, and the first end of the connection tether may be fastened to the front or rear pillar and the second end of the connection tether may be fastened to the airbag cushion.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a curtain airbag system of a vehicle according to an exemplary embodiment of the present disclosure will be described with reference to the accompanying drawings.

Figure 1:
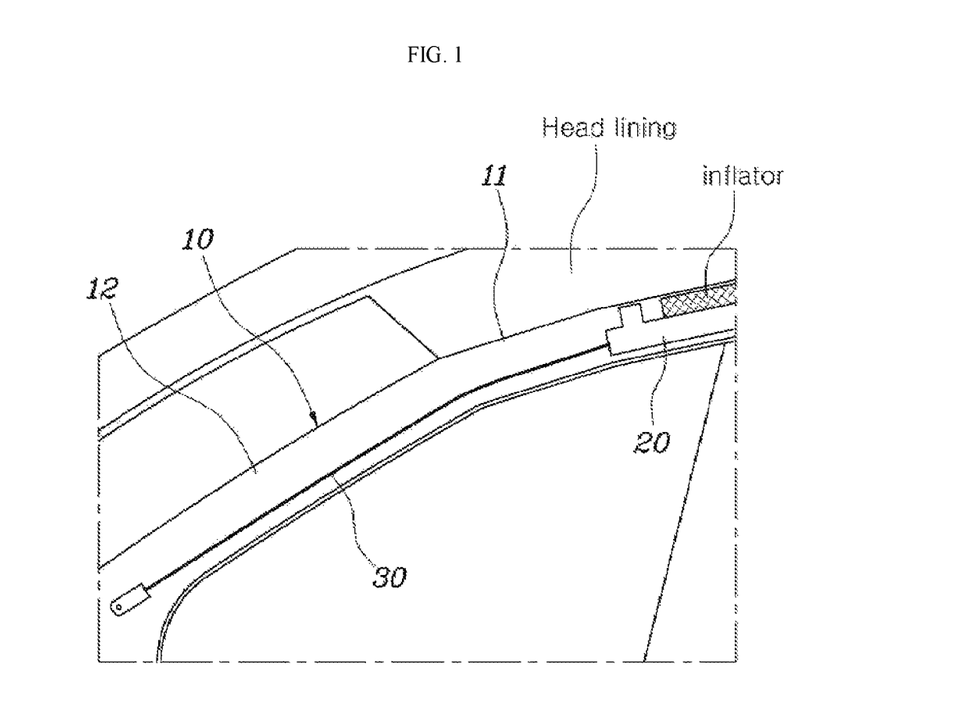
FIGS. 1 and 2 are views illustrating a curtain airbag system of a vehicle according to an exemplary embodiment of the present disclosure.
Figure 2:
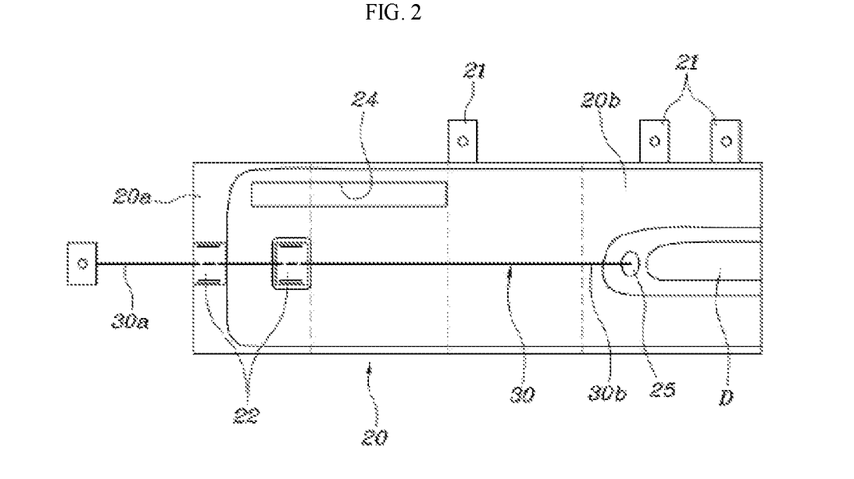
Figure 3:
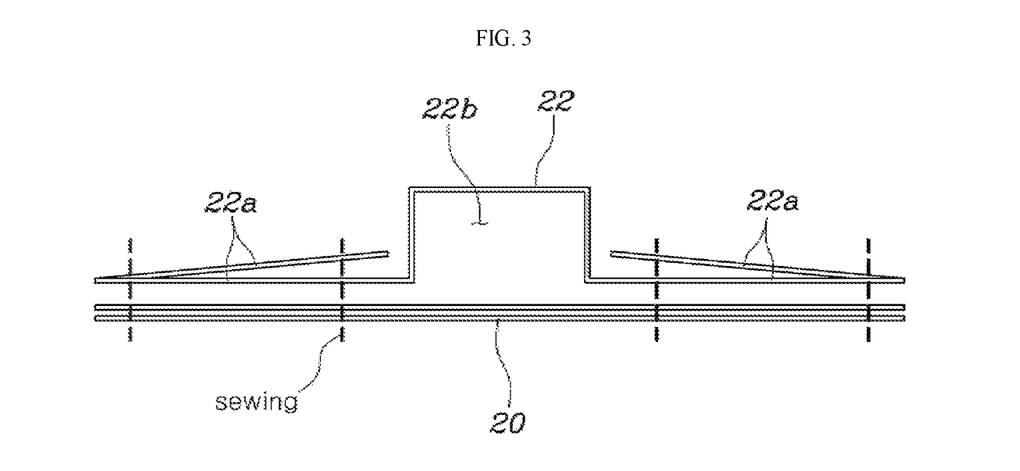
FIGS. 3 to 5 are views illustrating the curtain airbag system of a vehicle illustrated in FIG. 1 according to an exemplary embodiment of the present disclosure.
Figure 4:
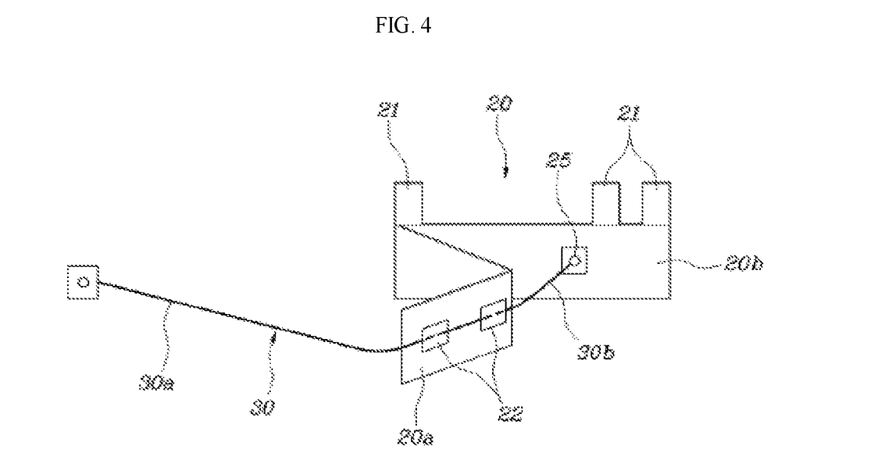
Figure 5:
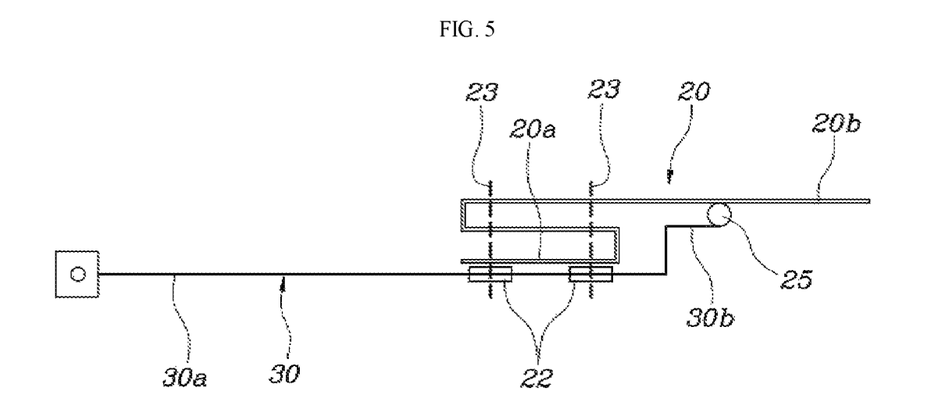
Figure 6:
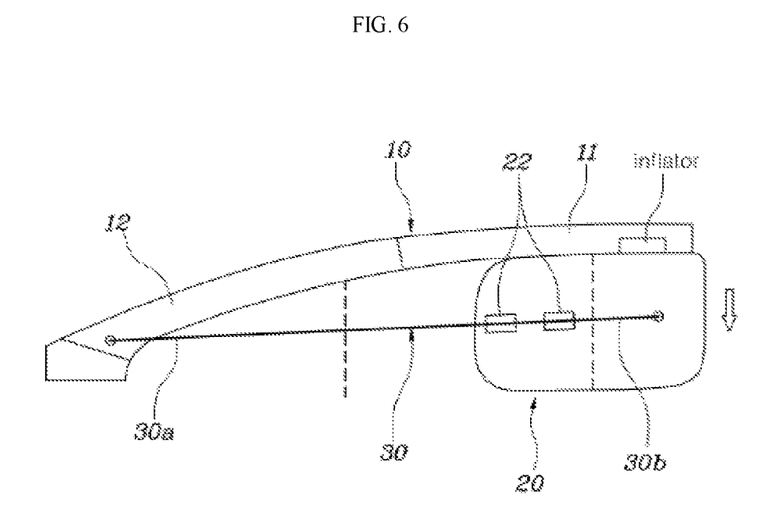
FIGS. 6 and 7 are views illustrating deployment of the curtain airbag system of a vehicle illustrated in FIG. 1 according to an exemplary embodiment of the present disclosure.
Figure 7:
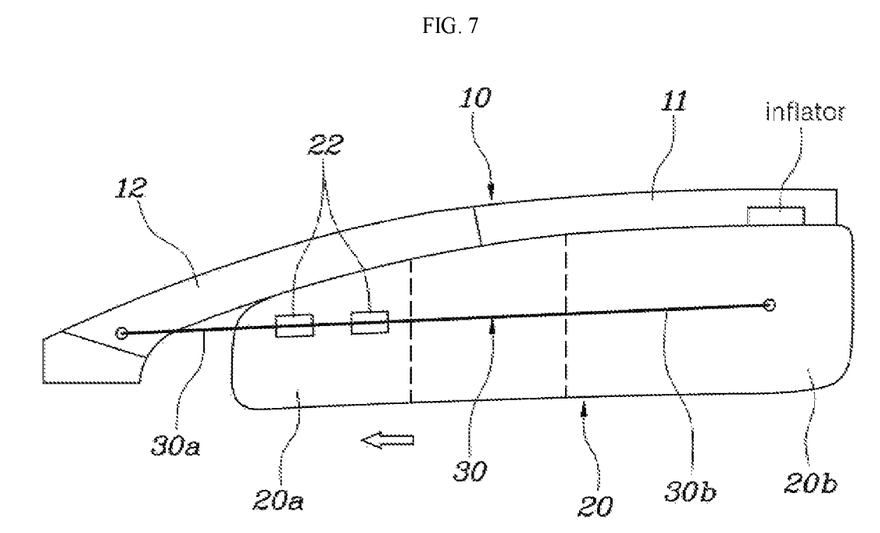

FIGS. 1 and 2 are views illustrating a curtain airbag system of a vehicle according to an exemplary embodiment of the present disclosure, FIGS. 3 to 5 are views for explaining the curtain airbag system of a vehicle illustrated in FIG. 1, and FIGS. 6 and 7 are views for explaining deployment of the curtain airbag system of a vehicle illustrated in FIG. 1.

As illustrated in FIGS. 1 and 2, the curtain airbag system of a vehicle according to the present disclosure may include: an airbag cushion 20 disposed to be deployed from a side frame 10 of a vehicle body toward a side of an occupant, and inflated to extend in a forward or backward direction after being deployed in a downward direction from the side frame 10 when a collision situation occurs; and a connection tether 30 having a first end 30a spaced and fastened apart from the airbag cushion 20 (e.g., spaced apart from while fastened to) in front of or behind the airbag cushion 20 and a second end 30b connected to the airbag cushion 20 to guide the airbag cushion 20 to be inflated in the forward or backward direction.

Particularly, the side frame 10 may be formed as a roof frame on a head lining side of the vehicle body. When the side frame 10 includes a pillar A, a pillar B, and a pillar C, the airbag cushion 20 may be installed in the pillar B area. For example, the airbag cushion 20 of the curtain airbag system according to the present disclosure may be installed using a device for rolling and/or folding an airbag cushion. When the side frame 10 includes a pillar A, a pillar B, and a pillar C, the airbag cushion 20 may be installed only in the pillar B area, and without being installed in the pillar A area or in the pillar C area.

In addition, even in a vehicle having three or more rows of seats, the airbag cushion 20 installed in the central pillar area, excluding the leftmost and rightmost pillars of the side frame 10, extends in the forward or backward direction, thereby safely protecting an occupant seated in the front or rear rows. Accordingly, when the side frame 10 includes a pillar A, a pillar B, a pillar C, and a pillar D, the airbag cushion 20 may be installed in the pillar B and C areas. For example, when the side frame 10 includes a pillar A, a pillar B, a pillar C, and a pillar D, the airbag cushion 20 may be installed only in the pillar B and C areas, without being installed in the pillar A area or in the pillar D area.

The airbag cushion 20 of the present disclosure may be provided in the side frame 10, and deployed toward the side of the occupant to protect the occupant from side collision when a collision occurs. The collision of the vehicle may be sensed by a controller configured to collect sensor information from a sensor to determine timing for deploying the airbag cushion 20, and the airbag cushion 20 may be inflated by being supplied with gas through an inflator, explosion of which may be adjusted by the controller. In addition, the airbag cushion 20 may include a delay chamber D for effectively absorbing the impact of the occupant.

Particularly, the airbag cushion 20 may be accommodated in a center pillar 11 area of the side frame 10, and may be inflated toward a front or rear pillar 12 when deployed. Conventionally, an airbag cushion is accommodated in a side frame along a length direction thereof. In the present disclosure, the airbag cushion 20 may be accommodated in the center pillar 11 area of the side frame 10, thereby making it possible to reduce an accommodation space, and the airbag cushion 20 may be deployed in the downward direction and then inflated in the forward or backward direction toward the front or rear pillar 12, thereby deploying the airbag cushion 20 to the side of the occupant.

Additionally, the airbag cushion 20 may be fastened and guided for an inflation direction by the connection tether 30. The connection tether 30 may guide the airbag cushion 20 for an inflation direction, with a first end 30a being spaced apart from the airbag cushion 20 in front of or behind the airbag cushion 20 and fastened to the front or rear pillar 12, and a second end 30b being fastened to the airbag cushion 20. Particularly, when the airbag cushion 20 is not deployed, the first end 30a of the connection tether 30 may be fastened to the front or rear pillar 12 and the second end 30b of the connection tether 30 may pass through the roof frame to be fastened to the airbag cushion 20. Accordingly, although the airbag cushion 20 is not mounted in the front or rear pillar 12 area, the airbag cushion 20 may be inflated along the connection tether 30 to cover the side of the occupant. The connection tether 30 may be temporarily fastened through a fastener in the front or rear pillar 12 area. As the fastener is released when the airbag cushion 20 is deployed, the connection tether 30 may move to a position to guide the airbag cushion 20.

According to the present disclosure, the airbag cushion 20 may be accommodated in the center pillar 11 area of the side frame 10, and guided by the connection tether 30 for the inflation direction when the airbag cushion 20 is deployed, and thus, the airbag cushion 20 may be inflated to cover the side of the occupant. As a result, it may be possible to reduce a space for accommodating the airbag cushion 20, and it may be possible to deploy the airbag cushion 20 to a location to protect the occupant by using the connection tether 30.

The present disclosure described above will be described in more detail. As illustrated in FIG. 2, when the airbag cushion 20 is to be inflated in the forward direction, the first end 30a of the connection tether 30 may be spaced apart from the airbag cushion 20 in front of the airbag cushion 20 and fastened to the side frame 10, and the second end 30b of the connection tether 30 may be connected to a rear end portion 20b of the airbag cushion 20 across a front end portion 20a of the airbag cushion 20.

Particularly, the inflation direction of the airbag cushion 20 that is directed in the forward or backward direction may be changed depending on the position of the occupant to be protected according to the vehicle design. To assist in understanding the present disclosure, the airbag cushion 20 will be described as being configured to be inflated in the forward direction. Accordingly, the airbag cushion 20 may be configured to be inflated from the roof frame configuring the side frame 10 toward the pillar A, which is a front pillar.

When the airbag cushion 20 is to be inflated in the forward direction, the first end 30a of the connection tether 30 may be fastened to the side frame 10 while being spaced apart from the airbag cushion 20 in front of the airbag cushion 20, and the second end 30b of the connection tether 30 may be connected to the rear end portion 20b of the airbag cushion 20 across the front end portion 20a of the airbag cushion 20, and thus, the airbag cushion 20 may be guided and inflated in the forward direction along the extension direction of the connection tether 30. In other words, in the present disclosure, since the airbag cushion 20 should be deployed in the downward direction and then inflated in the forward direction, the first end 30a of the connection tether 30 may be fastened in front of the airbag cushion 20, and the second end 30b of the connection tether 30 may be connected to the rear end portion 20b of the airbag cushion 20, and thus, the front end portion 20a of the airbag cushion 20 may be guided and inflated in the forward direction along the connection tether 30.

Meanwhile, as illustrated in FIG. 2, the airbag cushion 20 may be fastened to the side frame 10 through a fastener 21 formed at an upper end thereof. The fastener 21 may be disposed at an opposite side of the inflation direction of the airbag cushion 20 that is directed in the forward or backward direction. The airbag cushion 20 may be fastened to an airbag housing having an inflator embedded therein, and the fastener 21 may be fastened to the side frame 10 through the airbag housing. The airbag housing is general, and thus not illustrated in the drawings.

Since the fastener 21 of the airbag cushion 20 may be disposed at an opposite side of the inflation direction, it may be possible to reduce a space for accommodating the airbag cushion 20 after being folded. When the fasteners 21 are all formed in a longitudinal direction, which is the inflation direction of the airbag cushion 20, an accommodation space should be secured based on how many fasteners 21 are formed. Thus, the fasteners 21 should be formed at the opposite side of the inflation direction only in some sections of the airbag cushion 20.

In other words, when the airbag cushion 20 is to be inflated in the forward direction, the fasteners 21 may be disposed at the upper end of the airbag cushion 20 in an area excluding the front end portion 20a and fastened to the side frame 10. Accordingly, the front end portion 20a of the airbag cushion 20 is not bound to the side frame 10 by the fastener 21, and may be folded to the rear end portion 20b, thereby reducing a space for accommodating the airbag cushion 20. In addition, since the airbag cushion 20 may be fastened to the side frame 10 through the fastener 21, it may be possible to maintain the location of the airbag cushion 20 after being deployed.

Meanwhile, as illustrated in FIGS. 2 and 3, the front end portion 20a of the airbag cushion 20 may include a guide chamber 22 for the connection tether 30 to pass therethrough. In other words, the guide chamber 22 may be sewed (e.g., stitched or otherwise attached to) on and fastened to the airbag cushion 20 to allow the connection tether 30 to pass therethrough in the forward or backward direction, to move the front end portion 20a of the airbag cushion 20 along the guide chamber 22 as well as the connection tether 30. As illustrated in FIG. 3, when both ends 22a of the guide chamber 22 are fastened to the airbag cushion 20, an opening aperture 22b may be formed for the connection tether 30 to pass therethrough. Both ends 22a of the guide chamber 22 may be sewed or otherwise fastened on the airbag cushion 20 in a doubly folded state, thereby enhancing a coupling strength between the guide chamber 22 and the airbag cushion 20.

As the airbag cushion 20 is connected to the connection tether 30 through the guide chamber 22, the front end portion 20a of the airbag cushion 20 may be guided and moved along the connection tether 30. Meanwhile, the airbag cushion 20 of the present disclosure should be inflated to extend in the forward or backward direction after being deployed in the downward direction. Thus, the front end portion 20a of the airbag cushion 20 may be folded in a zigzag form in a backward direction thus exposing the guide chamber 22, with a lower end being rolled in an upward direction in the zigzag-folded state.

In other words, as illustrated in FIGS. 4 and 5, since the front end portion 20a provided with the guide chamber 22 may be folded in the zigzag form in the backward direction, the airbag cushion 20 may be unfolded and inflated in the forward direction when deployed. In particular, the airbag cushion 20 may be folded in the zigzag form causing exposure of the guide chamber 22, thereby preventing the connection tether 30 from being folded or twisted. Accordingly, when the airbag cushion 20 is deployed, the guide chamber 22 may be guided along the connection tether 30 to inflate the airbag cushion 20 in the forward direction. The front end portion 20a, which is folded in the zigzag form, may be rolled in the upward direction together with the rear end portion 20b, which is not folded in the zigzag form, to accommodate the airbag cushion 20 in the side frame 10 in a rolled shape.

Particularly, the front end portion 20a of the airbag cushion 20 may be folded in the zigzag form while avoiding a portion where the second end 30b of the connection tether 30 is connected. In the zigzag-folded state, overlapping portions may be tacked 23. As a result, when the airbag cushion 20 is deployed, the connection tether 30 may be prevented from being twisted, and the guide chamber 22 may be guided more smoothly along the connection tether 30 to inflate the airbag cushion 20 in the forward direction. In addition, as the overlapping portions are tacked 23 in the state where the airbag cushion 20 is folded in the zigzag form, the airbag cushion 20 may be maintained in the zigzag-folded state, thereby facilitating a folding work for accommodation. When the airbag cushion 20 is deployed, the tacked portions 23 may be released and deployment is induced.

The airbag cushion 20 may be folded in the zigzag form to expose the guide chamber 22, and the airbag cushion 20 may be unfolded in the downward direction when deployed and then the exposed guide chamber 22 may be moved along the connection tether 30, thereby guiding the airbag cushion 20 for an inflation direction. Accordingly, the airbag cushion 20 may be accommodated in the center pillar 11 area of the side frame 10, and the airbag cushion 20 is not required to be mounted in the front pillar 12 area, thereby making it possible to reduce a space for installing the airbag cushion 20.

Meanwhile, as illustrated in FIG. 2, the airbag cushion 20 may have a first dead zone 24 that extends in the length direction in an upper side of the front end portion 20a. The first dead zone 24, which is provided to exclude a protection zone in an overlapping portion between the inflated airbag cushion 20 and the front pillar 12 area, may be formed by sewing to prevent air from passing thereinto from the airbag cushion 20. However, the present disclosure is not limited to sewing as the fastening mechanism and other known fastening techniques may be used. Furthermore, the first dead zone 24 may be formed in an unnecessary section with which the occupant is not in contact in the inflated state, thereby enabling the inflator to prevent wasting gas for inflating the airbag cushion 20 and securing a deployment speed of the airbag cushion 20. In addition, the first dead zone 24 induces the airbag cushion 20 to be bent, thereby avoiding damage to the pillar due to the deployment of the airbag cushion 20.

The airbag cushion 20 may include a second dead zone 25 at a point where the second end 30b of the connection tether 30 is connected. The second dead zone 25, which is provided to fasten the second end 30b of the connection tether 30 to the airbag cushion 20, may be formed by sewing (or other fastening technique) to prevent air from passing thereinto from the airbag cushion 20. As the second dead zone 25 is formed in the airbag cushion 20, and the connection tether 30 is fastened by being sewed through the second dead zone 25, it may be possible to firmly fasten the second end 30b of the connection tether 30 to the airbag cushion 20.

In the curtain airbag system of a vehicle according to the present disclosure described above, the airbag cushion 20 may be deployed in the downward direction from the center pillar 11 of the side frame 10 as illustrated in FIG. 6, and the zigzag-folded portion of the airbag cushion 20 may be unfolded while the guide chamber 22 is guided along the connection tether 30 to inflate the airbag cushion 20 in the forward direction as illustrated in FIG. 7. As a result, the airbag cushion 20 may be accommodated in the side frame 10, requiring a minimum space. Additionally, the airbag cushion 20 may be deployed to cover the side of the occupant, thereby protecting the occupant safely.

In the curtain airbag system of a vehicle having the configuration as described above, the front or rear pillar 12 area of the roof/side frame 10 is not required for a space for accommodating the airbag cushion 20, thereby making it possible to reduce a space for accommodating the airbag cushion 20; the airbag cushion 20 may be guided by the connection tether 30 for a deployment direction, thereby more accurately deploying the airbag cushion 20 to a protection zone for the occupant; and the airbag cushion 20 may be folded in the zigzag form to expose the connection tether 30, thereby guiding the airbag cushion 20 for the deployment direction and securing a deployment speed.

Although the present disclosure has been shown and described with respect to specific exemplary embodiments, it will be apparent to those having ordinary skill in the art that the present disclosure may be variously modified and altered without departing from the spirit and scope of the present disclosure as defined by the following claims.

What is claimed is:

1. A curtain airbag system of a vehicle, comprising:
an airbag cushion disposed to be deployed from a side frame of a vehicle body toward a side of an occupant, and inflated to extend in a forward or backward direction after being deployed in a downward direction from the side frame when a collision occurs; and
a connection tether having a first end spaced and fastened apart from the airbag cushion in front of or behind the airbag cushion and a second end connected to the airbag cushion to guide the airbag cushion to be inflated in the forward or backward direction,
wherein a front end portion of the airbag cushion includes a guide chamber through which the connection tether passes,
wherein the front end portion of the airbag cushion is folded in a zigzag form in the backward direction exposing the guide chamber, with a lower end being rolled in an upward direction in a zigzag-folded state, and
wherein when the airbag cushion is to be inflated in the forward direction, the first end of the connection tether is fastened to the side frame while being spaced apart from the airbag cushion in front of the airbag cushion, and the second end of the connection tether is connected to a rear end portion of the airbag cushion across the front end portion of the airbag cushion.

2. The curtain airbag system of the vehicle of claim 1, wherein the airbag cushion is fastened to the side frame using a fastener formed at an upper end thereof, and the fastener is disposed at an opposite side of an inflation direction of the airbag cushion that is directed in the forward or backward direction.

3. The curtain airbag system of the vehicle of claim 2, wherein when the airbag cushion is to be inflated in the forward direction, the fastener is disposed at the upper end of the airbag cushion in an area excluding the front end portion and fastened to the side frame.

4. The curtain airbag system of the vehicle of claim 1, wherein the front end portion of the airbag cushion is folded in the zigzag form while avoiding a portion where the second end of the connection tether is connected, and overlapping portions in the zigzag-folded state are tacked.

5. The curtain airbag system of the vehicle of claim 1, wherein the airbag cushion has a first dead zone that extends in a length direction at an upper side of the front end portion.

6. The curtain airbag system of the vehicle of claim 1, wherein the airbag cushion has a second dead zone at a point where the second end of the connection tether is connected.

7. The curtain airbag system of the vehicle of claim 1, wherein the airbag cushion is accommodated in a center pillar area of the side frame, and inflated toward a front or rear pillar when deployed, and the first end of the connection tether is fastened to the front or rear pillar and the second end of the connection tether is fastened to the airbag cushion.

8. The curtain airbag system of the vehicle of claim 1, wherein when the side frame includes a pillar A, a pillar B, and a pillar C, the airbag cushion is installed in a pillar B area without being installed in a pillar A area or in a pillar C area.

9. The curtain airbag system of the vehicle of claim 1, wherein when the side frame includes a pillar A, a pillar B, a pillar C, and a pillar D, the airbag cushion is installed only in pillar B and C areas without being installed in a pillar A area or in a pillar D area.

10. The curtain airbag system of the vehicle of claim 1, wherein when the side frame includes a pillar A, a pillar B, a pillar C, and a pillar D, the airbag cushion is installed in pillar B and C areas without being installed in a pillar A area or in a pillar D area.

11. The curtain airbag system of the vehicle of claim 1, wherein the airbag cushion is installed using a device for rolling or folding the airbag cushion.

12. A curtain airbag system of a vehicle, comprising:
 an airbag cushion disposed to be deployed from a side frame of a vehicle body toward a side of an occupant, and inflated to extend in a forward or backward direction after being deployed in a downward direction from the side frame when a collision occurs; and
 a connection tether having a first end spaced and fastened apart from the airbag cushion in front of or behind the airbag cushion and a second end connected to the airbag cushion to guide the airbag cushion to be inflated in the forward or backward direction, wherein the airbag cushion is fastened to the side frame using a fastener formed at an upper end thereof, and the fastener is disposed at an opposite side of an inflation direction of the airbag cushion that is directed in the forward or backward direction, wherein when the airbag cushion is to be inflated in the forward direction, the fastener is disposed at the upper end of the airbag cushion in an area excluding the front end portion and fastened to the side frame, and wherein when the airbag cushion is to be inflated in the forward direction, the first end of the connection tether is fastened to the side frame while being spaced apart from the airbag cushion in front of the airbag cushion, and the second end of the connection tether is connected to a rear end portion of the airbag cushion across the front end portion of the airbag cushion.

* * * * *